(12) United States Patent
Schuster

(10) Patent No.: US 7,289,222 B1
(45) Date of Patent: Oct. 30, 2007

(54) INTERFEROMETER APPARATUS AND METHOD OF PROCESSING A SUBSTRATE HAVING AN OPTICAL SURFACE

(75) Inventor: Karl-Heinz Schuster, Koenigsbronn (DE)

(73) Assignee: Carl Zeiss SMT AG, Oberkochen (DE)

( * ) Notice: Subject to any disclaimer, the term of this patent is extended or adjusted under 35 U.S.C. 154(b) by 307 days.

(21) Appl. No.: 10/700,315

(22) Filed: Oct. 31, 2003

(51) Int. Cl.
*G01B 9/02* (2006.01)

(52) U.S. Cl. .................... 356/495; 356/514

(58) Field of Classification Search .......... 356/495, 356/493, 494, 491, 487, 488, 489, 492, 513
See application file for complete search history.

(56) References Cited

U.S. PATENT DOCUMENTS

| 4,340,306 A | 7/1982 | Balasubramanian |
| 4,732,483 A | 3/1988 | Biegen |
| 4,872,755 A * | 10/1989 | Kuchel .............. 356/495 |
| 5,004,346 A | 4/1991 | Kuhel |
| 5,416,586 A | 5/1995 | Tronolone et al. |
| 5,473,434 A | 12/1995 | de Groot |
| 5,488,477 A | 1/1996 | de Groot |
| 5,625,454 A | 4/1997 | Huang et al. |
| 5,777,741 A | 7/1998 | Deck |
| 6,128,080 A | 10/2000 | Janik et al. |
| 6,188,477 B1 | 2/2001 | Pu et al. |
| 2002/0176090 A1 | 11/2002 | Ohsaki et al. |

FOREIGN PATENT DOCUMENTS

| JP | 8-327453 | 12/1996 |
| JP | 10089935 A | 4/1998 |
| JP | 10221010 A | 8/1998 |

* cited by examiner

*Primary Examiner*—Hwa (Andrew) Lee
(74) *Attorney, Agent, or Firm*—Townsend and Townsend and Crew LLP

(57) ABSTRACT

A method of processing a substrate having an optical surface includes using an interferometer which includes optics for providing a beam of measuring light. The optics polarize the beam of measuring light such that a tangential polarization component continuously increases relative to a radial polarization component with increasing distance from an optical axis. The substrate is positioned in the beam of measuring light. Using the system, the interferometer determines a surface map of the optical surface, and determines deviations of the optical surface from a target shape.

48 Claims, 9 Drawing Sheets

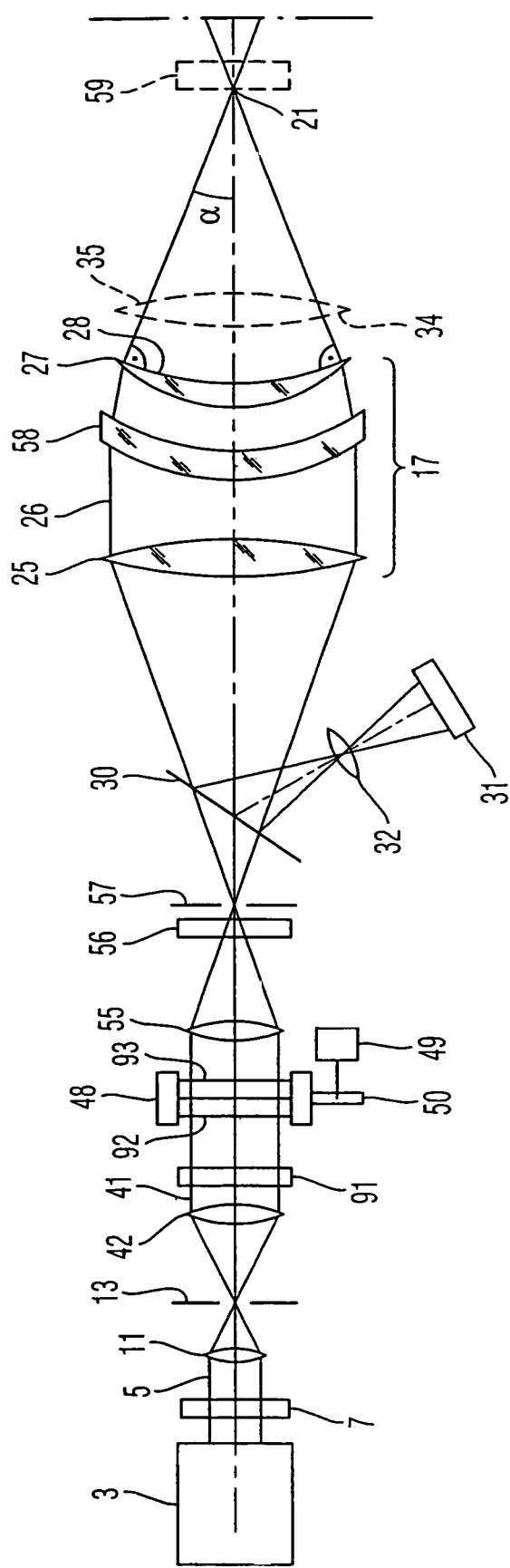
Fig. 19-1
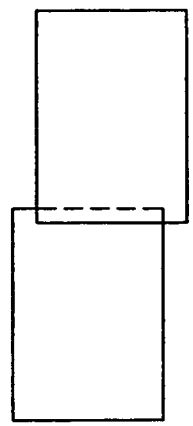
Fig. 19
Fig. 19-1
Fig. 19-2

INTERFEROMETER APPARATUS AND METHOD OF PROCESSING A SUBSTRATE HAVING AN OPTICAL SURFACE

BACKGROUND OF THE INVENTION

1. Field of the Invention

The present invention relates to the field of measuring and manufacturing optical surfaces. In particular the invention relates to an interferometer apparatus for measuring an optical surface and to a method for qualifying and manufacturing an optical surface by using the interferometer apparatus.

2. Brief Description of Related Art

The substrate having the optical surface is, for example, an optical component such as an optical lens or an optical mirror used in optical systems, such as telescopes used in astronomy, or systems used for imaging structures of a mask ("reticle") onto a radiation sensitive substrate ("resist") in a lithographic method. The success of such an optical system is substantially determined by the precision with which the optical surface can be machined or manufactured to have a target shape. In such manufacture it is necessary to compare the shape of the machined optical surface with its target shape, and to determine differences between the machined and target surfaces. The optical surface is then further machined at those portions where differences between the machined and target surfaces exceed e.g. a predefined threshold.

Interferometric apparatuses are commonly used for high precision measurements of optical surfaces. Examples of such apparatus are disclosed in U.S. Pat. No. 4,732,483, U.S. Pat. No. 4,340,306, U.S. Pat. No. 5,473,434, U.S. Pat. No. 5,777,741, U.S. Pat. No. 5,488,477, which documents are incorporated herein by reference.

It has been found that results achieved with the conventional interferometric apparatus and method are not completely satisfactory, in particular when the optical surface to be measured has a relatively strong curvature, i.e. a lower modulus of the radius of curvature (curvature=1/radius). An example of a high precision measurement of a spherical surface according to the prior art is illustrated with reference to FIG. 1 in the following.

In this example an interferometric apparatus 1 of the Fizeau-type is used. The apparatus comprises a laser light source 3 emitting a beam of measuring light 5 which is linearly polarized by a polarizer 7 and thereafter passed through a quarter wave plate 9 such that the beam 5 downstream of the quarter wave plate 9 is circularly polarized. A focussing lens 11 provides a focus of the beam within a pinhole of an aperture 13 such that a diverging beam 15 of measuring light is formed. In interferometer optics 17 transforms diverging beam 15 to a strongly converging beam 19 such that a focus 21 of the measuring light is formed on an optical axis 23 of interferometer optics 17. Wavefronts in converging beam 19 are substantially spherical wavefronts. The interferometer optics 17 comprises a collimating lens 25 forming a parallel beam 26, and a further focussing lens 27. Lens 27 has a concave spherical surface 28 having a center of curvature which coincides with focus 21. Surface 28 is used as a reference Fizeau surface of the interferometer apparatus 1, i.e. wavefronts of the measuring light reflected from surface 28 travel back the beam path, are reflected from a semitransparent mirror 30 and imaged onto a light sensitive substrate 31 of a CCD-camera using a camera optics 32.

A lens 33 having a convex spherical surface 34 to be measured is positioned in converging beam 19 such that a center of curvature of spherical surface 34 substantially coincides with focus 21. Wavefronts reflected back from surface 34 are also imaged on detector 31 and form an interference pattern with the wavefronts reflected back from surface 28 on the detector. A first measuring result $W_1$ obtained by camera 31 may be written as $$W_1 = W_R + W_T + W_S, \qquad (1)$$

wherein $W_R$ is a reference arm wavefront, $W_T$ is a test arm wavefront and $W_S$ is the test surface wavefront (see also Daniel Malacara, Optical Shop Testing, 2nd edit-ion, Wiley interscience Publication (1992)).

Thereafter lens 33 is rotated by 180° about optical axis 23 such that a mark 35 shown in FIG. 1a at the top of lens 33 is at the bottom as shown in FIG. 1b. A second measurement obtained in this position may be written as $$W_2 = W_R + W_T + W_S^{180°}, \qquad (2)$$

wherein $W_S^{180°}$ represents the test surface wavefront with the test surface rotated by 180°.

In a third measurement lens 33 is positioned such in converging beam 19 that the vertex of surface 34 is positioned at the focus 21. Such arrangement is also referred to as "cat's eye" arrangement. A third measuring result may be written as $$W_3 = W_R + \frac{1}{2}(W_T + W_T^{108°}). \qquad (3)$$

From $W_1$, $W_2$ and $W_3$ the desired test surface wavefront may be calculated as $$W_S = \frac{1}{2}(W_1 + W_2^{180°} - W_3 - W_3^{180°}), \qquad (4)$$

wherein $W_2^{180°}$ represent the images $W_2$ and $W_3$, respectively, which are numerically rotated by 180°.

The interferometer errors can be written as $$W_1 = \frac{1}{2}(W_1 - W_2^{180°} + W_3 + W_3^{180°}). \qquad (5)$$

With the above method it is possible to determine deviations of surface 34 from its spherical target shape, and it is also possible to calibrate the interferometer optics by determining deviations of the wavefront shapes in converging beam 19 from their desired spherical shape and determining deviations of the Fizeau surface 28 from its spherical shape.

As already mentioned above, also the interferometric apparatus and method illustrated with reference to FIG. 1 has drawbacks when the measured surfaces have a large diameter and a small modulus of the radius of curvature. This results in an insufficient quality of a manufactured optical component.

SUMMARY OF THE INVENTION

It is an object of the present invention to provide an interferometric apparatus and method for improving measurement of optical surfaces.

Further, it is an object of the present invention to provide an improved method of manufacturing optical components.

The forgoing objects are accomplished by providing an interferometric apparatus and method using a beam of measuring light which has an improved distribution of polarization states thereof across the beam cross section. In general, the beam of measuring light has at each location in a cross section thereof a radial component polarized in a direction radially oriented with respect to a beam axis, and a tangential component in a direction orthogonal to the radial component.

According to a first preferred aspect of the invention the distribution of the polarization states of the beam of measuring light is such that the tangential component continuously increases relative to the radial component with increasing distance from the beam axis.

According to a preferred embodiment the interferometer apparatus comprises a polarization system including a polarization changing member positioned in the beam of measuring light, wherein the polarization changing member introduces a relative suppression of the radial component or the tangential component of the light of the beam of measuring light with respect to the other component wherein an amount of the suppression gradually increases with increasing distance from the beam axis.

Preferably, it is the tangential component which is suppressed by the polarization changing member with increasing distance from the beam axis, and a half wave plate is positioned in the beam of measuring light downstream of the polarization changing member for rotating the resulting distribution due to the polarizing changing member to form the desired distribution.

Preferably, the polarization changing member comprises a dome-shaped optical interface. The interface is preferably provided with a plurality of dielectric layers.

According to a further preferred embodiment the interferometer apparatus comprises a polarization system including a polarization changing member which introduces a relative suppression of the radial component or the tangential component of the light of the beam of measuring light with respect to the other component and/or introduces a phase shift between the radial component and the tangential component, wherein the polarization changing member is rotatable about the beam axis, wherein a mask is provided which is rotatably connected with the polarization changing member, wherein the mask comprises at least one sector blocking the light of the beam wherein the sector extends in a circumferential direction about the beam axis over more than 140°. The mask defines the cross section of the beam downstream of the mask, and this cross section is preferably sector-shaped and extends over less than 30° in the circumferential direction.

According to a further preferred embodiment the cross section has a shape of two such sectors spaced apart by 180° about the beam axis.

According to a further preferred embodiment the polarization changing member comprises a plurality of sectors spaced apart in the circumferential direction about the beam axis wherein each sector introduces a substantially same suppression and/or phase shift.

According to a second preferred aspect of the present invention the beam of measuring light has a predefined distribution of polarization states across its cross section, and such distribution of polarization states is rotated about the beam axis for averaging over different polarization states.

According to a preferred embodiment the interferometer apparatus comprises a polarization system including a polarization changing member introducing a relative suppression of the radial component or the tangential component of the light of the beam of measuring light with respect to the other component and/or the polarization changing member introducing a phase shift between the radial component and the tangential component, and wherein the polarization changing member is rotatable about the beam axis.

Preferably, the light of the beam of measuring light is linearly polarized in a same direction across the whole cross section of the beam.

According to a third preferred aspect of the invention a mirror used in a cat's eye arrangement is chosen such that it has a reduced influence on polarization states of the light of the beam of measuring light at high angles of incidence. Preferably, such property of the mirror is obtained by providing the mirror surface with a plurality of suitably chosen dielectric layers.

Further, it is preferred that the mirror surface is provided on a metal substrate.

According to a fourth preferred embodiment, the interferometer apparatus comprises an auxiliary optics for reducing incidence angles of the beam of measuring light when the same is incident on the mirror surface in the focus of the cat's eye arrangement.

An embodiment of the method of qualifying or manufacturing the optical surface makes use of the above interferometric methods and apparatuses.

The method of manufacturing the optical surface preferably includes machining of the optical surface after measuring the same, wherein the machining is performed in dependence of deviations of the measured optical surface from its target shape.

According to a preferred embodiment the method of manufacturing includes a final finishing of the machined optical surface.

BRIEF DESCRIPTION OF THE DRAWINGS

The forgoing as well as other advantageous features of the invention will be more apparent from the following detailed description of exemplary embodiments of the invention with reference to the accompanying drawings, wherein.

DETAILED DESCRIPTION OF EXEMPLARY EMBODIMENTS

Figure 1A:
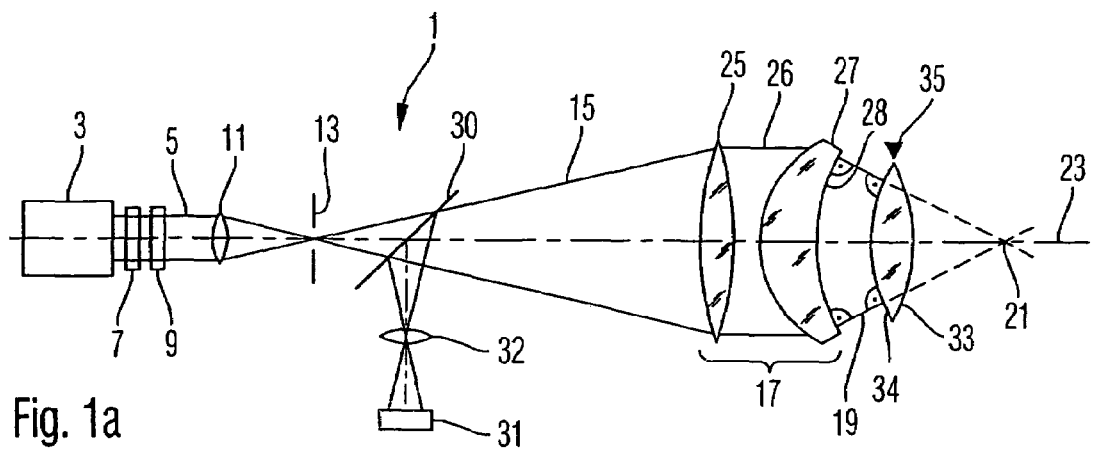
FIG. 1 illustrates a prior art interferometric method for qualifying a substrate having an optical surface.

In the embodiments described below, components which are identical in function and structure are designated as far as possible by the same reference numerals. Therefore, to understand the features of the individual components of a specific embodiment, the descriptions of other embodiments should be referred to.

A drawback of the conventional method illustrated above with reference to FIG. 1 will now be illustrated with reference to FIGS. 2 and 3. It is to be noted that the illustrated prior art method is just one suitable example for illustrating such drawbacks resulting from polarization effects in the beam of the measuring light.

The invention obviating such drawbacks is, however, not limited to the apparatus and method illustrated in FIG. 1 and may be applied to any interferometer apparatus and method.

Figure 1B:
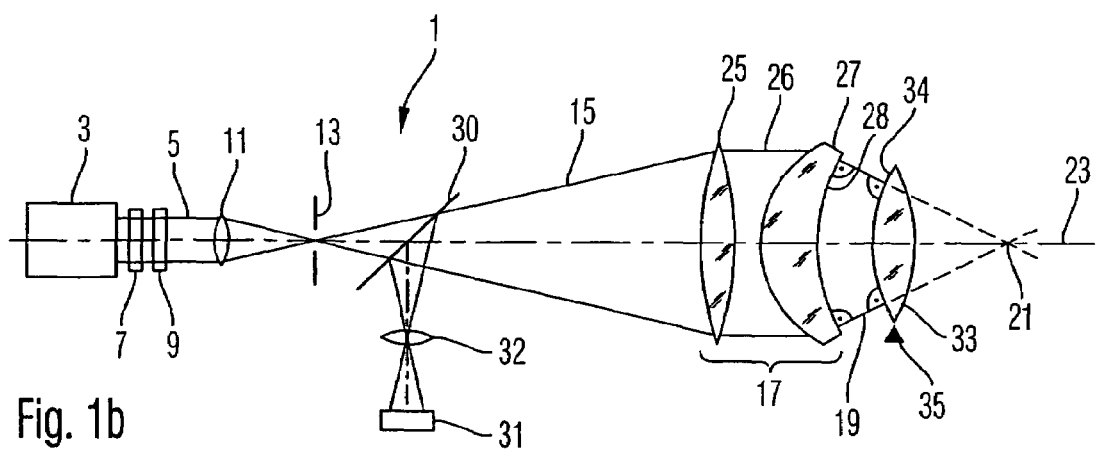
Figure 1C:
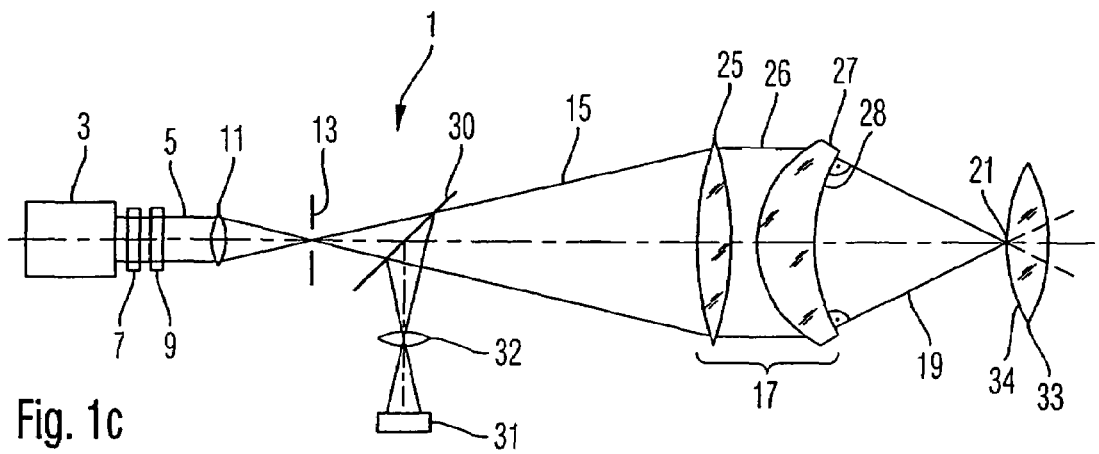
Figure 2:
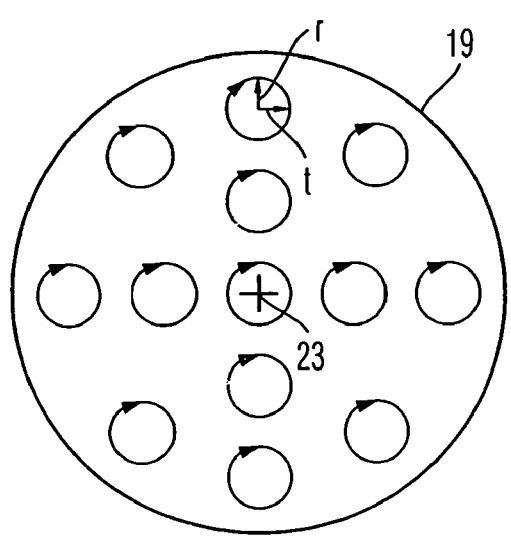
FIG. 2 illustrates a distribution of polarization states in a beam of measuring light used in the apparatus according to FIG. 1.

FIG. 2 shows a distribution of polarization states of the light of beam 15, 26, 19 of measuring light in FIG. 1c before the beam is incident on mirror 34 positioned at focus 21. The light of the beam is at first linearly polarized across its whole cross section by polarizer 7. The linear polarization is changed to a circular polarization by passing the beam through quarter wave plate 9. FIG. 2 shows with a plurality of circles that a constant right circular polarization state is achieved over the whole cross section of converging beam 19.

At each location in the cross section of beam 19 the light has a radial component r and a tangential component t. When the light is circularly polarized both components r and t have the same size and a phase shift such that the electrical field vector rotates in the propagation direction.

Figure 3:
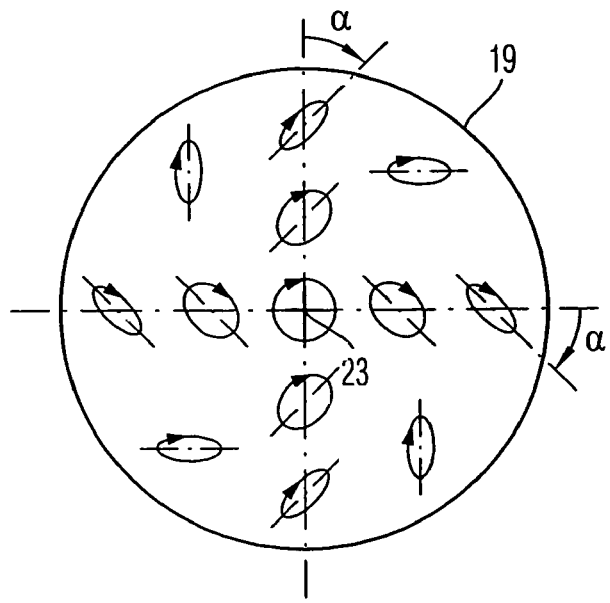
FIG. 3 illustrates an influence of a mirror on the polarization states of measuring light as illustrated in FIG. 2.

FIG. 3 illustrates the distribution of the polarization states after reflection at mirror 34 in the cat's eye arrangement. In the center of the beam the light is normally incident on mirror 34, and the polarization state is substantially unchanged, i.e. a circular polarization state in a region around axis 23. With increasing distance from the optical axis 23 the incidence angles of the light of the beam of measuring light 19 increase. With increasing incidence angle the reflection at the mirror surface introduces higher and higher polarization dependent effects.

At higher angles of incidence the radial component of the polarization is reduced relative to the tangential component such that the circular polarization state is disturbed, and a phase shift between the radial and tangential polarization components may be introduced by the reflection such that the circular polarization state is further reduced. When the angle of incidence is close to the Brewster's angle the radial polarization component is completely suppressed.

From FIG. 3 it appears that the circular polarization state is unchanged in the center on the optical axis 23 wherein the polarization states get more and more elliptic with increasing distance from axis 23 wherein a main axis of the ellipses are tilted by an angle α with respect to the radial direction.

In general, a Fizeau interferometer as shown in FIG. 1 has the advantage that an effect of the interferometer optics 17 on the test beam reflected from the surface under test is compensated since the reference beam reflected from the Fizeau surface travels through the same optics. This advantage is reduced with polarization dependent effects as illustrated in FIG. 3 due to the different relative intensities of the radial and tangential polarization components in the test beam and the reference beam. The test beam has reduced radial components at higher distances from the optical axis whereas the test beam reflected from the Fizeau surface does not show such reduction of the radial components since the reflection at the Fizeau surface takes place under normal incidence. Further, phase shifts induced at higher angles of incidence are interpreted as curvatures in the field when evaluating the interference fringes.

Figure 4:
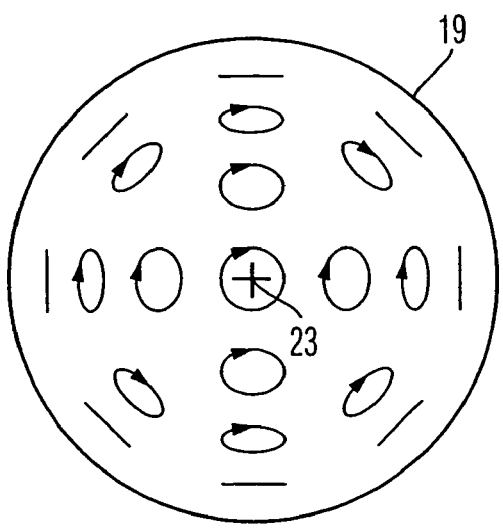
FIG. 4 illustrates a distribution of polarization states in the beam of measuring light according to an embodiment of the present invention.

According to an embodiment of the invention a distribution of polarization states of the light of beam 19 is prepared as illustrated in FIG. 4. On the optical axis 29 the light is circular polarized light. With increasing distance from the axis 29 a radial component of the polarization is continuously reduced such that the tangential component gets more and more dominant, and in the outer regions of the beam the light is linearly polarized light in the tangential direction. With such distribution of the polarization states in the beam of measuring light the adverse effect under higher angles of incidence illustrated above are noticeably linearly reduced. At the highest angles of incidence the light is polarized in the tangential direction and the suppression of the radial component induced by the mirror in the cat's eye arrangement will have a reduced effect, accordingly.

It is to be noted that the distribution of the polarization states as illustrated in FIG. 4 is not only of advantage in the cat's eye arrangement of FIG. 1c. Such distribution is of advantage in any interferometer apparatus where the beam of measuring light is reflected from or penetrates optical surfaces under high angles of incidence.

An interferometer apparatus using a beam of measuring light having a distribution of polarization states as shown in FIG. 4 is illustrated with reference to FIGS. 5 and 6 in the following. The interferometer apparatus 1 shown in FIG. 5 comprises a laser light source 3 emitting a beam 5 of measuring light 5 which is linearly polarized in a same direction across its cross section by a linear polarizer 7. The beam is focused by a collimating lens 11 into a pinhole of an aperture 13. Thereafter the diverging beam emitted from the pinhole is formed to a parallel beam 41 by a further collimating lens 42. A half wave plate 43 is mounted in a rotational bearing 44 to be rotatable about an optical axis 23 of the interferometer apparatus 1. A motor 45 and a suitable gear 46 is provided for rotating half wave plate 43 about the axis 23 at a constant speed. The beam passing half wave plate 43 is also linearly polarized across its whole cross section wherein the polarization direction rotates about the optical axis 23 with twice the speed of rotation of plate 43. Downstream of plate 43 a mask 47 is mounted on a rotational bearing 48 to be rotatable about the axis 23. A motor 49 and a gear 50 is provided to rotate the mask 47 about the axis 23 with twice the speed of rotation of plate 43.

Figure 6:
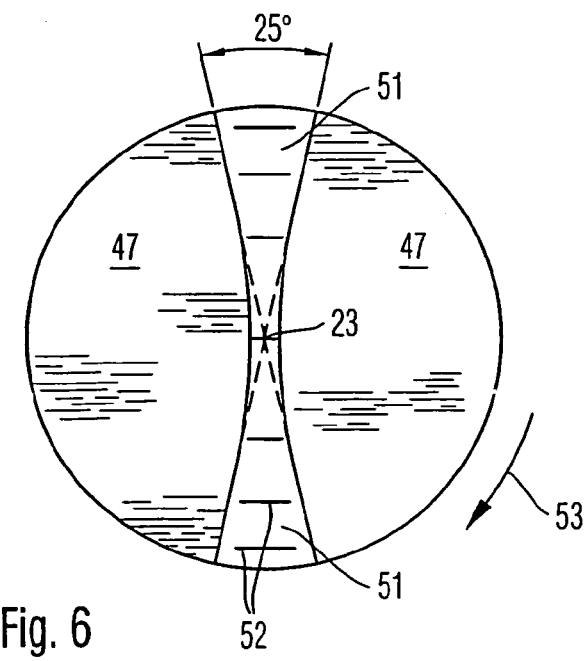
FIG. 6 illustrates components of a polarization system of the apparatus according to FIG. 5.

A shape of mask 47 is illustrated in FIG. 6. The mask 47 has a vertical axis of symmetry in FIG. 6 and blocks the beam across its whole cross section except for two sectors 51 having an opening angle of about 25° and positioned symmetrically with respect to optical axis 23 wherein a minimum width of the aperture is maintained in a region around the optical axis 23.

Motors 45 and 49 are synchronized such that the light is polarized in a direction orthogonal to a symmetry axis of mask 47. The polarization direction of the light is illustrated in FIG. 6 by lines 52. By rotating half wave plate 43 and mask 47 as illustrated above the arrangement of mask 47 and polarizations 52 as shown in FIG. 6 is rotated about the optical axis as indicated by arrow 53. Within one revolution of the arrangement of FIG. 6 peripheral portions of the cross section of the beam downstream of mask 47 are illuminated with light which is substantially polarized in a tangential direction with respect to the optical axis 23, and a central portion of the cross section is illuminated with light oriented in all directions, i.e. both radial and tangential directions. The distribution of polarization states, averaged over time, will have a configuration as shown in FIG. 4.

This light is passed through a further collimating lens 55, an averaging plate 56 and a pinhole of a further aperture 57 to form a diverging beam 15 entering an interferometer optics 17 comprising collimating lenses 25, 58 and 27 to form a converging beam 19 of measuring light forming a focus 21. Lens 27 has a concave spherical surface 28 forming a Fizeau surface of the interferometer apparatus 1. FIG. 5 shows the apparatus with a mirror 59 positioned in the cat's eye arrangement at focus 21. Wavefronts reflected back from mirror 59 and wavefronts reflected back from Fizeau surface 28 are imaged on a detector 31 by a camera optics 32 after reflection from a semitransparent mirror 30 positioned in diverging beam 15. The arrangement of mask 47 and polarizations 52 of FIG. 6 may perform one or more revolutions during one integration cycle of camera 31. With the above arrangement the light of converging beam 19 which is incident on mirror 59 under higher angles of incidence is substantially polarized in the tangential direction, thus reducing disturbing effects induced by the suppression of the radial component in the reflection from mirror 59.

Figure 8:
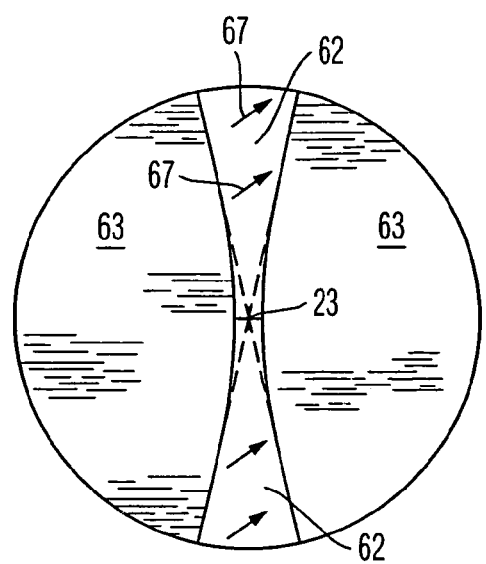
FIG. 8 illustrates a component of polarization system of the apparatus according to FIG. 7.
Figure 7:
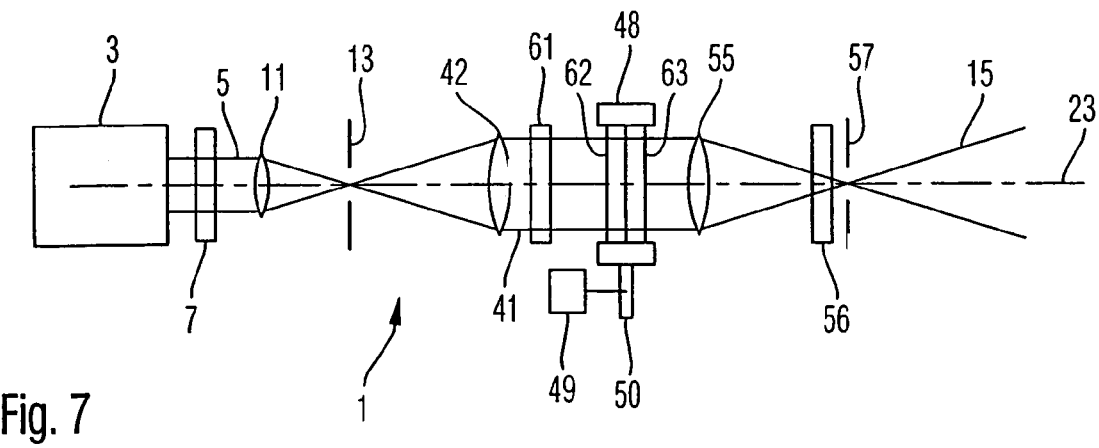
FIG. 7 illustrates a portion of an interferometer apparatus according to a further embodiment of the invention.

FIGS. 7 and 8 illustrate an embodiment which is similar to that illustrated with reference to FIGS. 5 and 6. Again, a parallel beam 41 of linear polarized light is formed by a laser light source 3, a linear polarizer 7, a collimating lens 11, a pinhole aperture 13 and a collimating lens 42. A quarter wave plate 61 is fixedly mounted in linearly polarized beam 41 such that the beam after passing quarter wave plate 61 is a beam of circularly polarized light. In this beam a combination of a quarter wave plate 62 and a mask 63 is rotatably mounted about optical axis 23 on rotating bearings 48 driven by a motor 49 and gear 50. As shown in FIG. 8 mask 63 has a shape similar to that of mask 47 in FIG. 6. A main direction of quarter wave plate 62 relative to mask 63 is indicated by arrows 67 in FIG. 8. The circularly polarized light passing quarter wave plate 62 will be polarized in a horizontal direction of FIG. 8, i.e. in a same direction with respect to mask 63 as indicated by lines 52 in FIG. 6. Thus, the apparatus shown in FIG. 7 has substantially a same effect as that illustrated with reference to FIG. 5 above.

Figure 9:
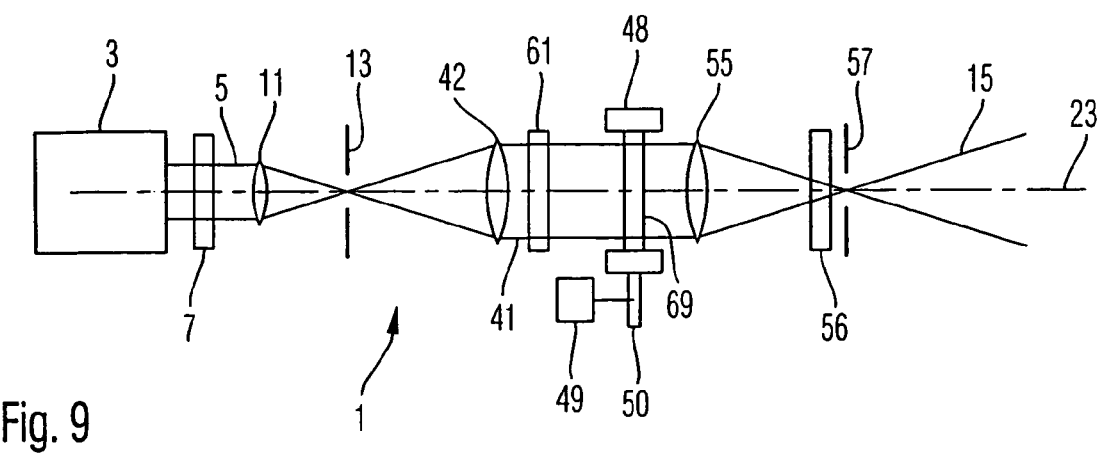
FIG. 9 illustrates a portion of an interferometer apparatus according to a still further embodiment of the invention.

A further variant of the apparatus shown in FIG. 5 will be illustrated with reference to FIGS. 9 and 10 below.

An interferometer apparatus 1 shown in FIG. 9 has a structure similar to the apparatus illustrated with reference to FIG. 7 above. A beam of linearly polarized light 41 is formed to be a beam of circularly polarized light by passing through a quarter wave plate 61. In this beam a multi section plate 69 is rotated about an optical axis 23.

Figure 10:
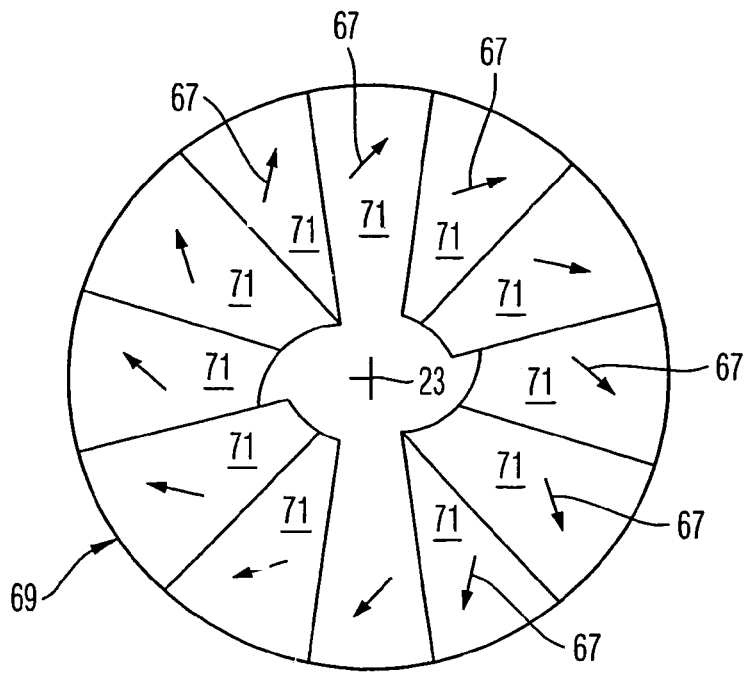
FIG. 10 illustrates a component of a polarization system of the apparatus according to FIG. 9.

FIG. 10 is an elevational view on multi section plate 69. Plate 69 comprises a plurality of quarter wave plates 71, each having a main axis of orientation as indicated by an arrow 67. Each plate 71 has a shape which is close to a sector shape with respect to the optical axis 23 wherein most of the plates do not extend to axis 23 except two plates 71 which extend to the optical axis 23 and further comprise a portion around axis 23. There are plates which extend from the periphery of plate 69 to terminate at larger and smaller distances from the optical axis 23. These differences in extension towards the optical axis are provided for reducing a non-steady distribution of the polarization states averaged after one revolution of multi sector plate 69. In the average the distribution of the polarization states will be close to the distribution shown in FIG. 4.

Figure 12:
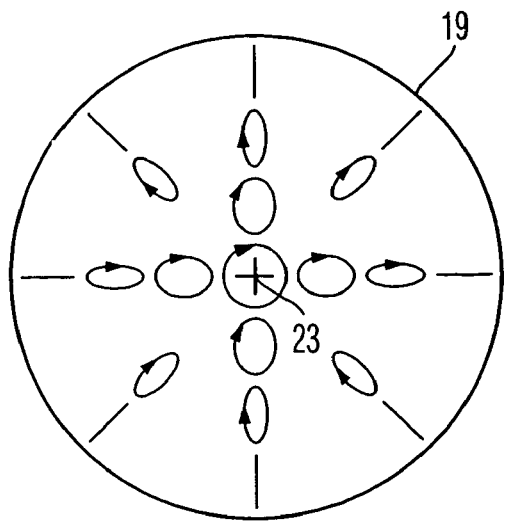
FIG. 12 illustrates a distribution of polarization states in a beam of measuring light of the apparatus of FIG. 11.
Figure 11:
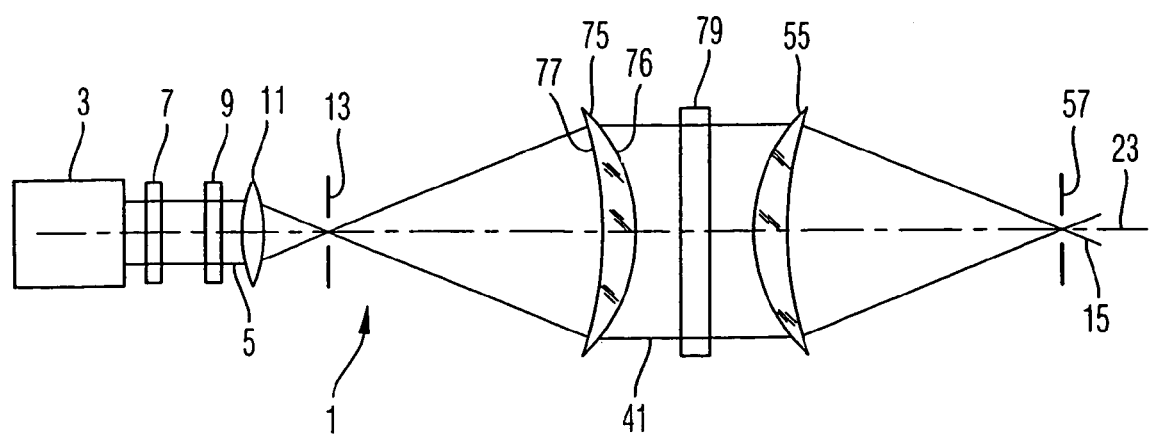
FIG. 11 illustrates a portion of an interferometer apparatus according to a further embodiment of the invention.

FIG. 11 shows a portion of a further embodiment of an interferometer apparatus 1. A beam 5 of circularly polarized light is provided by a laser light source 3, a linear polarizer 7 and a quarter wave plate 9. The beam is focused through a pinhole 13 and collimated by a spherical meniscus lens 75 having a convex surface 76 and a concave surface 77. Convex spherical surface 76 is provided with a layer similar to such layers used in polarizing beam splitters. This results in a distribution of polarization states in beam 41 having passed the lens 75 as illustrated in FIG. 12. A central beam which is normally incident on surface 76 is substantially not effected and maintains its circular polarization state. Peripheral beams which are incident on surface 76 under a high angle of incidence are substantially completely polarized in a radial direction with respect to the optical axis 23. Intermediate beams are elliptically polarized with a main axis oriented in the radial direction.

A quartz crystal plate 79 is positioned in beam 41 downstream of polarizing surface 76. A thickness of plate 79 is determined such that the plate rotates the direction of orientation of the polarization of the light by 90°, and the distribution of polarization states will be transformed from that shown in FIG. 12 to that shown in FIG. 4. Thus, the beam having passed plate 79 may be used in the interferometric method for reducing polarization changing effects of optical surfaces with high angles of incidence.

Cuvets with liquids such as solutions of sugar and menthol may perform a similar function as quartz plate 79 shown in FIG. 11.

Since polarizing surface 76 reduces the intensity in the beam of measuring light at the periphery thereof an intensity compensating layer may be provided on surface 77 of lens 75. The compensating layer has an absorption which increases with reducing distance from axis 23.

Figure 13:
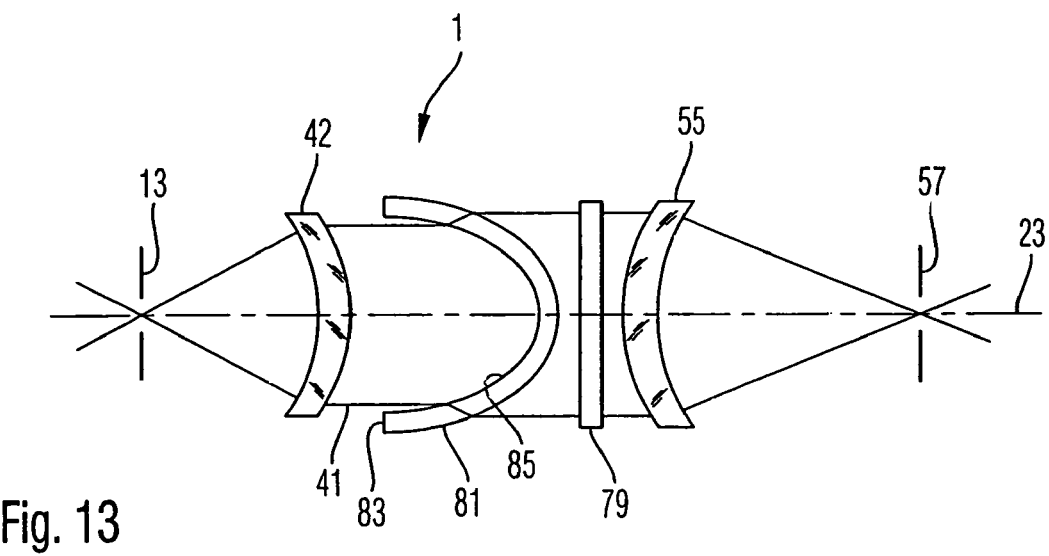
FIG. 13 illustrates a portion of an interferometer apparatus according to a still further embodiment of the invention.

The polarizing function of the polarizing layer may be increased when such polarizing layer is provided on a surface 81 of a dome-shaped optical member 83 as shown in FIG. 13. Member 83 is provided in the beam path of a beam 41 of circularly polarized light collimated by a collimating lens 42. Surfaces 81 and 85 of member 83 have a parabolic shape resulting in higher angles of incidence on surface 81 at larger distances from optical axis 23. Member 83 may be formed of quartz glass or plastics having low internal stress and low birefringence. Outer surface 81 of member 83 is provided with a plurality 87 of alternating dielectric layers as schematically illustrated in FIG. 14.

Figure 14:
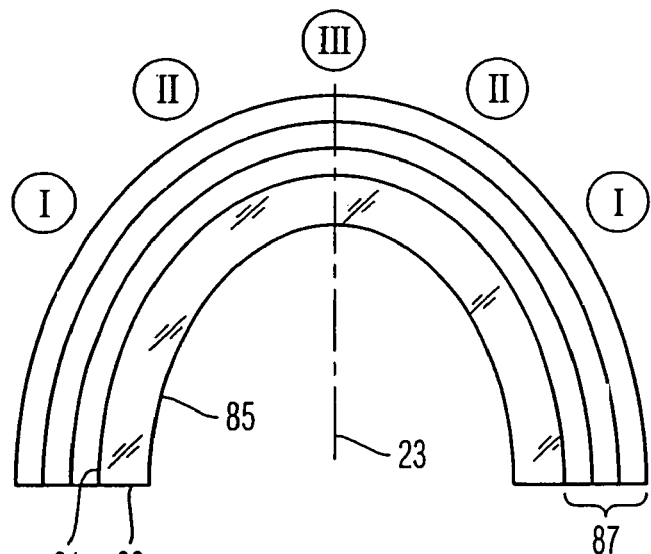
FIG. 14 is a schematical section of a polarization changing member of the apparatus according to FIG. 13.

FIG. 14 indicates a peripheral region I of the layer structure, a central region III close to the optical axis 23 and an intermediate region II. In the peripheral region I layers 87 have a thickness corresponding to half of the wavelength of the light of beam 41. The layers in the peripheral portion substantially completely block light polarized in the tangential direction from passing through member 83. If the same layers are provided in central portion III, the layer structure 87 would be completely reflective in the central portion. Therefor, the composition of the layers is continuously changed from the peripheral portion I to the central portion III as Illustrated in the table below.

TABLE

| | I | II | II |
|---|---|---|---|
| 1 | $ZrO_2$ | $ZrO_2 + Al_2O_3$ | $Al_2O_3$ |
| 2 | $SiO_2$ | $SiO_2 + Al_2O_3$ | $Al_2O_3$ |
| 3 | $ZrO_2$ | $ZrO_2 + Al_2O_3$ | $Al_2O_3$ |
| 4 | $SiO_2$ | $SiO_2 + Al_2O_3$ | $Al_2O_3$ |
| . | . | . | . |
| . | . | . | . |
| . | . | . | . |

Figure 15:
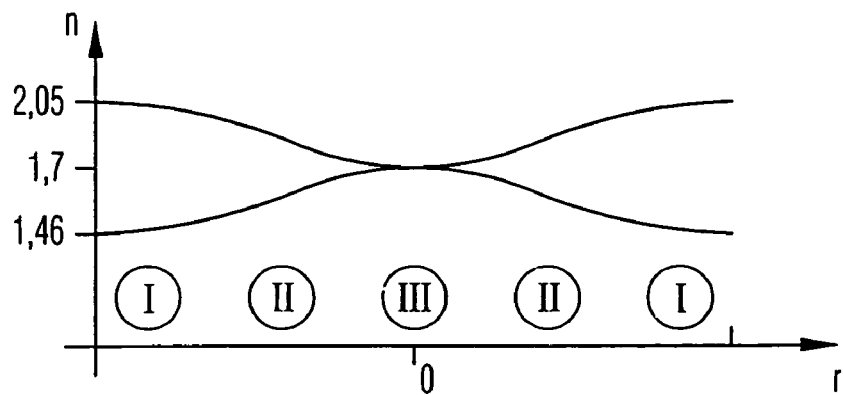
FIG. 15 is a graph for illustrating dielectric layer properties of layers used in the polarization changing member shown in FIG. 14.

In the peripheral portion the layers are alternating layers of $ZrO_2$ having a refractive index of 2.05, and of $SiO_2$ having a refractive index of 1.46. In the intermediate portion II with reducing distance from axis 23 more and more $Al_2O_3$ is mixed with $ZrO_2$ to reduce the refractive index of the layer, and more and more $Al_2O_3$ is mixed into $SiO_2$ to more and more increase the refractive index of the corresponding layers. In the central portion III all layers are substantially made of $Al_2O_3$ having a refractive index of 1.7. A distribution of the refractive indices in dependence of the distance r from the optical axis of the two types of material layers is illustrated in FIG. 15. Due to such dependency the plurality of layers 87 shows a substantially completely polarizing function in the peripheral portion I, and the plurality of layers is not completely reflective in central portion III. A further example of a material having a low refractive index is Chiolith with a refractive index of 1.32. It is to be noted that changing the refractive index in the direction of the layer by changing the composition of the layer involves changing the geometrical thickness of the layer while maintaining its optical thickness at $\lambda/4$.

Figure 16:
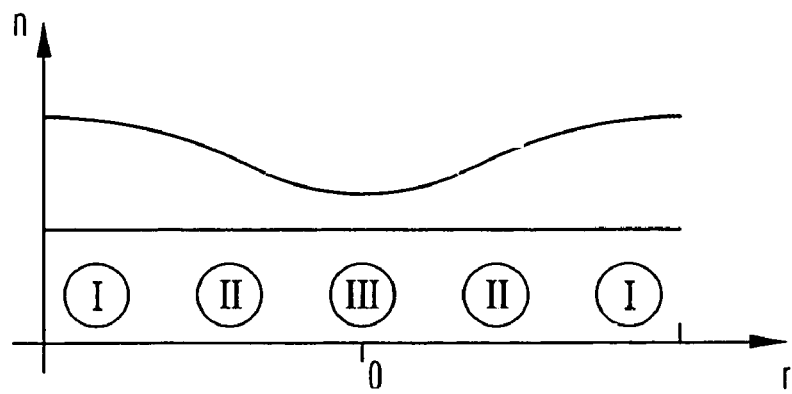
FIG. 16 is a variant of FIG. 15.
Figure 17:
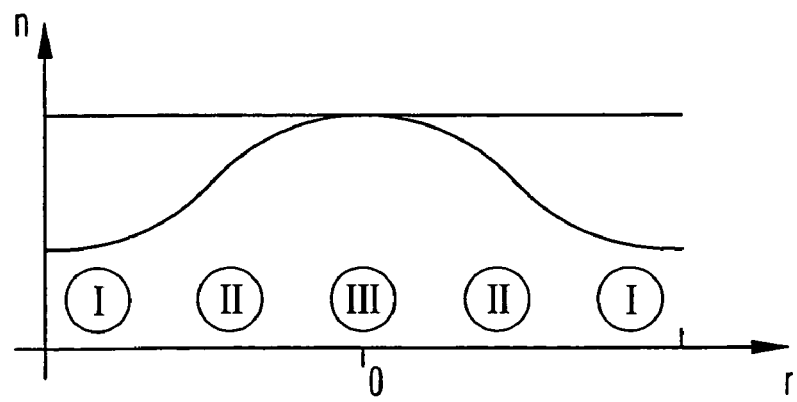
FIG. 17 is a further variant of FIG. 15.

FIGS. 16 and 17 show further possibilities of radial dependencies of refractive indices of alternating layers of a layer structure 87. Such dependencies may be also obtained by mixing $ZrO_2$ and $SiO_2$ within a same layer. Also other dielectric materials may be used to obtain a same or similar function.

Figure 18:
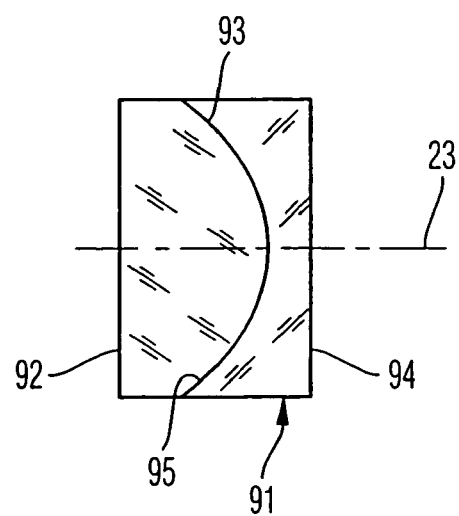
FIG. 18 illustrates an embodiment of a polarization changing member which may be used in the apparatus according to FIG. 13.

FIG. 18 shows a further embodiment of a polarizing member 91 which may be used as a carrier for a polarizing layer, similar to lens 75 with surface 76 in FIG. 12, or dome-shaped member 83 with surface 81 shown in FIG. 13. Member 91 shown in FIG. 18 is made of a glass block 92 having a convex parabolic surface 93 and a glass block 94 having a concave parabolic surface 95. Convex surface 93 carries a polarizing layer structure such as illustrated with reference to FIGS. 14 to 17. Blocks 92 and 94 are cemented together using a cement having substantially the same refractive index as the material of which blocks 92 and 94 are formed. These materials may comprise quartz glass having low internal stress and birefringence, or a so-called "Pockels' glass" showing a very low birefringence. Such glass may be obtained under the tradename SF57 from SCHOTT, Germany.

Now, reference is made to FIG. 5 again. With this apparatus a measuring procedure as illustrated with reference to FIGS. 1a, 1b and 1c may be performed wherein polarizing effects of the mirror are reduced by preparing polarization states of the light of the beam of measuring light as shown in FIG. 4. A further reduction of polarization effects in the cat's eye arrangement may be obtained by positioning mirror 59 at focus 21 which mirror 59 is different from surface 43 under test. Mirror 59 is provided with alternating dielectric layers designed such that the polarizing effects under high angles of incidence are reduced. Alternatively, mirror 59 may be made of metal having a complex refractive index resulting in a nonvanishing reflective index at the Brewster's angle. A particularly suitable metal material is silver wherein the silver surface is polished to a high optical quality. A coating of a few nanometers with $SiO_2$ on the silver surface will have substantially no noticeable optical effect and protect the surface from corrosion.

The interferometer apparatus and method illustrated sofar has substantial-advantages with respect to polarization dependent effects. Still, some polarization dependent effects remain in such apparatus and may be further improved as illustrated in the following. Such remaining effects are caused by the interferometer optics 17 itself. The glass material used for lenses 25, 58 and 27 will have remaining internal stresses causing birefringence. Such birefringence will contribute to the interferometric measurement and can be reduced by using an interferometer apparatus as illustrated in FIG. 19.

A beam of measuring light 41 provided by a laser light source 3, a linear polarizer 7, a collimator 11, a pinhole aperture 13 and a collimator 42 is formed to be circularly polarized light by a quarter wave plate 91. A combination of a quarter wave plate 92 and a linear polarizer 93 is rotatably mounted with respect to optical axis 23 by a bearing 48, a motor 49 and gear 50. Quarter wave plate 92 transforms the circularly polarized light to linear polarized light which is further polarized by polarizer 93. No limiting mask is provided such that the beam after passing polarizer 93 is linearly polarized in a same direction across the whole cross section of the beam. The polarization direction rotates about optical axis 23. While performing interferometric measurements with a substrate 35 under test or mirror 59 at focus 21 the measurements are performed with plural polarization directions. For instance, 1000 or more images with camera 31 may be taken while successively completing one revolution of linear polarizer 93. Thereafter, the plurality of images may be averaged using a computer, thus averaging out contributions caused by birefringence in the interferometer optics 17 from the measuring result.

Alternatively, quarter wave plate 91 may be omitted, and the combination of quarter wave plate 92 and polarizer 93 may be replaced by a half wave plate, resulting in a linearly polarized beam rotating about optical axis 23 with twice the speed of rotation of the half wave plate.

Figures 2, 19:
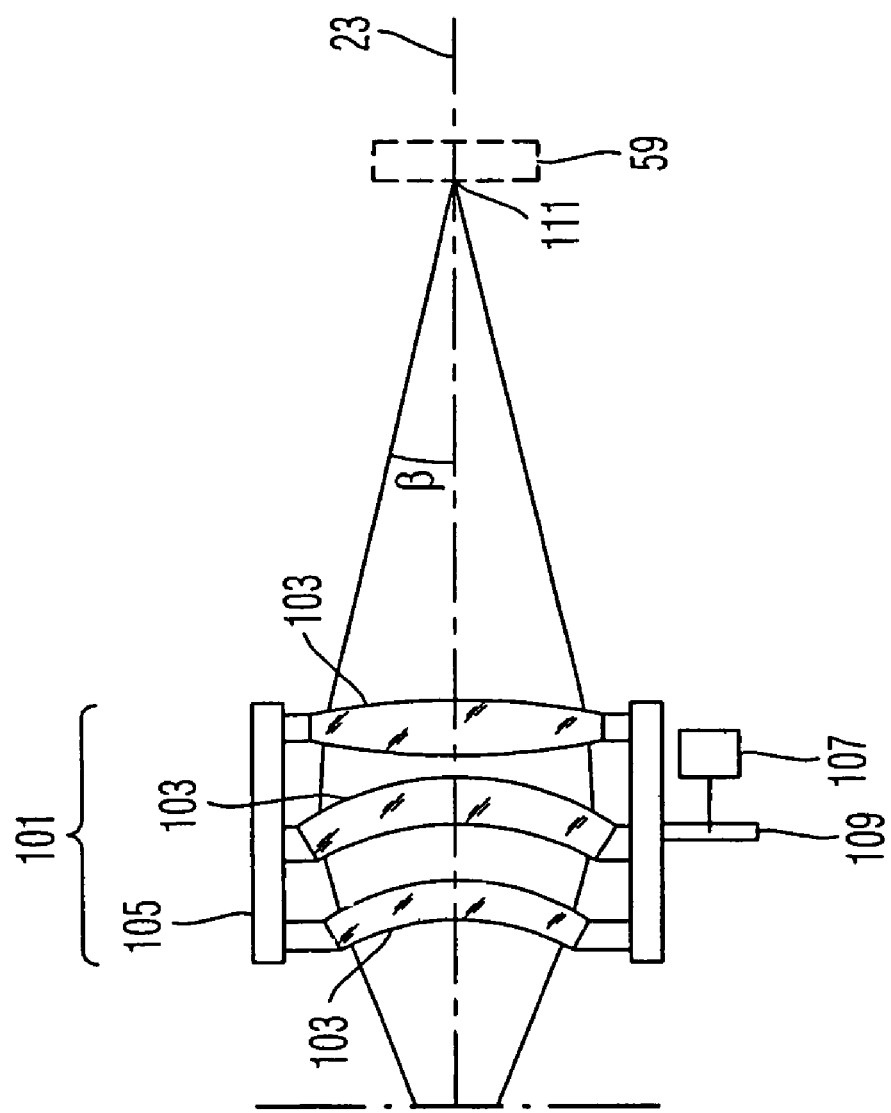
FIG. 19 illustrates an interferometer apparatus according to a further embodiment of the invention.

Further, linear polarizer 93 of FIG. 19 may be omitted since quarter wave plate 92 performs already a substantially complete linear polarization.

A further embodiment of the interferometric apparatus and method will be illustrated with reference to FIG. 19 below. This method involves an auxiliary optics 101 having a plurality of lenses 103 mounted as a barrel 105 to be rotatable about optical axis 23 driven by a motor 107 and gear 109. Auxiliary optics 101 has on its left side an opening angle α equal to that of interferometer optics 17, and a left focus of auxiliary optics 101 coincides with focus 21 of interferometer optics 17. On its right side auxiliary optics 101 has an opening angle β which is lower than left opening angle α. When mounted in the beam path downstream of interferometric optics 17 as shown in FIG. 19, auxiliary optics 101 forms a focus 111 of the beam of measuring light of interferometer optics 23.

Figure 5:
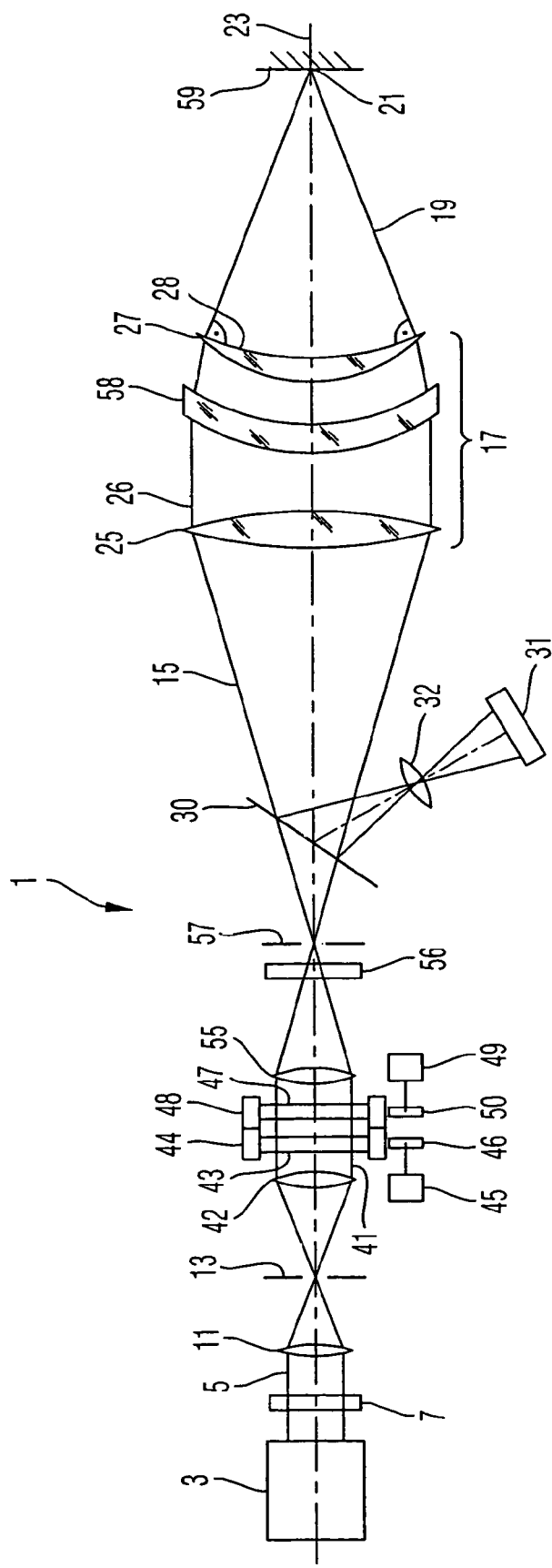
FIG. 5 illustrates an interferometer apparatus according to an embodiment of the present invention.

In a first calibrating step the interferometer optics 17 used in the interferometer 1 shown in FIG. 19 is calibrated by mounting the optics in the apparatus as shown in FIG. 5 which apparatus provides the beam of measuring light having substantially tangential polarization at its periphery (see FIG. 4). The optics is calibrated according to equation (4) above by performing a procedure as illustrated in FIGS. 1a, 1b and 1c with some spherical optical surface in FIGS. 1a and 1b. Thereafter, calibrated optics 17 is mounted in the interferometer apparatus shown in FIG. 19 with auxiliary optics 101 mounted downstream thereof. Lenses 103 of auxiliary optics 101 are made of a glass showing low birefringence, such as SF57. In each rotational position of auxiliary optics 101 a plurality of measurements is performed, each with a different polarization direction of the beam of measuring light by rotating bearing 48 and averaging to obtain a measuring result for one rotational position of auxiliary optics 101. This measurement is repeated for a plurality of rotational positions of auxiliary optics 101. From the plurality of measuring results rotationally symmetric components of deviations of auxiliary optics 101 may be determined. Thus, auxiliary optics 101 is calibrated. The calibration may be represented by the usual Zernike coefficients $Z_9, Z_{16}, Z_{25}, Z_{36}, \ldots$ Thereafter the apparatus shown in FIG. 19 may be used for testing a spherical optical surface 34 of a substrate 35 shown with broken lines in FIG. 19. Surface 34 is measured in a first position corresponding to FIG. 1. It is then rotated by 180° about optical axis 23, and the second measurement corresponding to FIG. 1b is performed. Thereafter substrate 35 is removed from the beam path and the third measurement (cat's eye configuration) is performed through auxiliary optics 101 with mirror 59 positioned at focus 111. By using auxiliary optics 101 the incidence angles of the beam of measuring light on mirror 59 are reduced by β/α, resulting in a substantial reduction of polarizing effects of mirror 59. The calibration result of auxiliary optics 10 is included in formula (3) above, and deviations of optical surface 43 may be determined with high precision according to equation (4) above.

Having qualified optical surface 34 it is then possible to identify those regions on surface 34 where deviations from the target shape exceed a certain threshold. A machining step is then performed to reduce these deviations. The machining may comprise polishing or ion beam etching and other methods.

Thereafter, the above illustrated measurements are repeated to determine remaining deviations of surface 34 from its target surface. If these deviations still exceed the predetermined threshold a further machining step is performed. Otherwise, a finishing step is performed on the optical surface 34. The finishing may include a final polishing of the surface or depositing a reflection coating or an anti-reflection coating. A reflection coating may include, for example, a plurality of material layer pairs, for example 40 pairs of alternating molybdenum and silicon layers or other conventional layers.

Thicknesses of these latter layers may be about 5 nm and will be adapted to a wavelength to be reflected from the optical surface, such that a reflection coefficient is substantially high.

An anti-reflection coating which is intended to reduce reflections of radiation of an interface of an optical element, such as a lens element, may include magnesium flouride or lanthanum oxide or other conventional materials.

Finally, the reflect-ion coating or antireflection coating may be covered by a cap layer for passivating the reflection coating. The cap layer may include a layer formed by depositing ruthenium, for example.

The above mentioned threshold value will differ from the application of the optical surface in the optical system for which it is designed. For example, if the optical surface is a lens surface in an objective for imaging a reticle structure onto a resist with radiation of a wave length $\lambda=193$ nm, such threshold value may be in a range of about 2 nm to 10 nm, and if the optical surface will be used as a mirror surface in an imaging objective using EUV (extreme ultraviolet) radiation with a wave length of $\lambda=13.5$ nm, the threshold value will be in a range of about 0.1 nm to 1.0 nm.

In the above, where deviations of a target shape are determined by an interferometric measurement any method for interferogram evaluation may be used. Possible applicable methods are disclosed in the book edited by Daniel Malacara, Optical Shop Testing, 2nd edition, Wiley interscience Publication (1992). Further, methods of phase shifting interferometry (PSI) may be applied, wherein a plurality of interferograms are analyzed for producing a surface map. Examples of phase shifting interferometry are also presented in the book by Malacara mentioned above. The phase shift is advantageously generated by varying the wavelength of the light providing the interferometric measuring beam using a wavelength tunable light source.

It is further to be noted that the optical components involved in the above interferometric methods are subject to gravity during measurement. This may result in deformations of the surfaces of those components which are fixed in suitable mounts for arranging the components within the beam path of the interferometer. Even though the optical axis 23 is oriented horizontally in FIGS. 1, 3 and 5, it is also possible to perform the same measurements with an optical axis oriented vertically in the gravitational field. In any event, it is possible to use mathematical methods to simulate deformations of the optical components in the gravitational field. One such method is known as FEM ("finite element method"). All determinations of optical properties and deviations illustrated above may involve taking into account results of such mathematical methods for correcting and/or improving the determined results.

Therefore, while the present invention has been shown and described herein in what is believed to be the most practical and preferred embodiments, it is recognized that departures can be made therefrom within the scope of the invention, which is therefore not be limited to the details disclosed herein but is to be accorded the full scope of the claims so as to embrace any and all equivalent methods and apparatus.

What is claimed is:

1. An interferometer apparatus comprising:
  a light source configured to emit a beam of measuring light;
  interferometer optics configured to direct the beam of measuring light toward an object, the interferometer optics comprising optical components symmetrically arranged with respect to a first optical axis;
  a detector system configured to detect an interference of a first portion of the beam of measuring light having interacted with the object and a second portion of the beam measuring light;
  wherein light in the beam of measuring light has at each location in a cross section of the beam, a radial component polarized in a direction radially oriented with respect to the first optical axis, and a tangential component polarized in a direction orthogonal to the radial component;

wherein the interferometer optics comprises a polarization system including a polarization changing member positioned in the beam of measuring light, wherein the polarization changing member introduces a relative suppression of one of the radial component and the tangential component of light of the beam of measuring light with respect to the other component; and wherein an amount of the suppression of the one of the radial component and the tangential component gradually increases with increasing distance from the first optical axis.

2. The interferometer apparatus according to claim 1, wherein the polarization system comprises a quarter wave plate positioned in a beam path of the beam of measuring light between the light source and the polarization changing member.

3. The interferometer apparatus according to claim 2, wherein the light source is a source of linearly polarized light.

4. The interferometer apparatus according to claim 2, wherein the polarization system further comprises a second polarizer positioned in the beam path between the light source an the quarter wave plate, wherein the second polarizer is a linear polarizer of a substantially constant polarization strength across its cross section.

5. The interferometer apparatus according to claim 2, wherein the polarization changer member suppresses the tangential component.

6. The interferometer apparatus according to claim 5, wherein the polarization system further comprises a half wave plate positioned in the beam of measuring light downstream of the polarization changing member.

7. The interferometer apparatus according to claim 1, wherein the polarization changer member comprises a dome shaped optical interface.

8. The interferometer apparatus according to claim 7, wherein the optical interface is of a parabolic shape.

9. The interferometer apparatus according to claim 7, wherein the optical interface comprises a plurality of dielectric layers.

10. An interferometer apparatus comprising:
a light source configured to emit a beam of measuring light;
interferometer optics configured to direct the beam of measuring light toward an object, the interferometer optics comprising optical components symmetrically arranged with respect to a first optical axis;
a detector system configured to detect an interference of a first portion of the beam of measuring light having interacted with the object and a second portion of the beam of measuring light;
wherein light in the beam of measuring light has at each location in a cross section of the beam a radial component polarized in a direction radially oriented with respect to the first optical axis and a tangential component polarized in a direction orthogonal to the radial component;
wherein the interferometer optics comprises a polarization system including a polarization changing member positioned in the beam of measuring light, wherein the polarization changer member introduces at least one of a relative suppression of one of the radial component and the tangential component of light of the beam of measuring light with respect to the other component, and a phase shift between the radial component and the tangential component, and wherein the polarization changing member is rotatable about the first optical axis.

11. The interferometer apparatus according to claim 10, wherein the polarization system is configured such that the beam of measuring light is substantially circularly polarized light upstream of the polarization changing member, and wherein the polarization changing member is configured such that the beam of measuring light is substantially linearly polarized light downstream of the polarization changing member.

12. The interferometer apparatus according to claim 10, wherein an amount of the relative suppression and of the phase shift is substantially constant over substantially the whole cross section of the beam of measuring light directed toward the object.

13. The interferometer apparatus according to claim 10, wherein the polarization system further comprises a mask rotatably connected with the polarization changing member, wherein the mask comprises at least one sector blocking light of the beam of measuring light, the sector extending in a circumferential direction about the first optical axis over more than 140°.

14. The interferometer apparatus according to claim 13, wherein the polarization changing member comprises a half wave plate rotatably connected to the mask such that the mask is rotatable about the first optical axis twice as fast as the polarization changing member.

15. The interferometer apparatus according to claim 13, wherein the polarization changing member comprises a quarter wave plate rotatably fixedly connected to the mask.

16. The interferometer apparatus according to claim 10, wherein the polarization changing member comprises at least one sector with respect to the first optical axis, the sector extending in a circumferential direction about the first optical axis over less than 30°, wherein an amount of the relative suppression and of the phase shift is substantially constant in the sector.

17. The interferometer apparatus according to claim 16, wherein a first sector includes a region around the first optical axis.

18. The interferometer apparatus according to claim 16, wherein the polarization changing member comprises a plurality of radial sectors circumferentially offset about the first optical axis with respect to each other, wherein amounts of the relative suppression and of the phase shift in the radial sectors are substantially equal to each other.

19. The interferometer apparatus according to claim 10, further comprising a mirror having a substantially flat mirror surface positioned on the first optical axis and substantially orthogonal thereto.

20. The interferometer apparatus according to claim 19, wherein the mirror comprises a metal substrate having a surface providing the mirror surface.

21. The interferometer apparatus according to claim 20, wherein the metal comprises silver and wherein the mirror surface is covered with a protective layer.

22. The interferometer apparatus according to claim 19, wherein the mirror comprises a glass substrate having a surface providing the mirror surface.

23. The interferometer apparatus according to claim 19, wherein the mirror comprises a plurality of dielectric layers.

24. The interferometer apparatus according to claim 19, wherein the plurality of dielectric layers is configured such that a reflective index of light polarized transversely to the mirror surface is increased with respect to mirror being not provided with the plurality of dielectric layers.

25. The interferometer apparatus according to claim 10, further comprising a mirror and an auxiliary optics having a plurality of optical components symmetrically arranged with respect to a second optical axis, wherein the auxiliary optics is mountable with respect to the interferometer optics such that the first and second optical axes substantially coincide, and such that a focus of the beam of measuring light is imaged, by the auxiliary optics onto a mirror surface of the mirror.

26. The interferometer apparatus according to claim 25, wherein the auxiliary optics is rotatable about the first optical axis.

27. A method of manufacturing a substrate having an optical surface, the method comprising:
- providing an interferometer apparatus having an interferometer optics providing a beam of measuring light, wherein light in the beam of measuring light has at each location in a cross section of the beam a radial component polarized in a direction radially oriented with respect to an optical axis, and a tangential component polarized in a direction orthogonal to the radial component;
- polarizing the beam of measuring light such that the tangential component continuously increases relative to the radial component with increasing distance from the optical axis;
- arranging the substrate in the beam of measuring light;
- interferometrically determining a surface map of the optical surface;
- determining deviations of the optical surface of the substrate from a target shape thereof in dependence of the surface map; and
- machining the first surface of the optical substrate in dependence of the determined deviations.

28. The method according to claim 27, wherein the determining of the surface map of the optical surface comprises:
- interferometrically taking a first measurement of wavefronts generated by reflecting the beam of measuring light from the optical surface;
- rotating the substrate about an optical axis of the interferometer optics; and
- interferometrically taking a second measurement of wavefronts generated by reflecting the beam of measuring light from the optical surface;
- wherein the surface map is determined in dependence of the first and second measurements.

29. The method according to claim 28, wherein the determining of the surface map of the optical surface further comprises:
- positioning a mirror in a focus of the beam of measuring light; and
- interferometrically taking a third measurement of wavefronts generated by reflecting the beam of measuring light from the mirror;
- wherein the surface map is further determined in dependence of the third measurement.

30. A method of manufacturing a substrate having an optical surface, the method comprising:
- providing an interferometer apparatus having an interferometer optics providing a beam of measuring light;
- polarizing the beam of measuring light such that light of the beam is substantially linearly polarized in a polarization direction which is substantially constant across a cross section of the beam;
- rotating the polarization direction about an optical axis;
- arranging the substrate in a beam of measuring light while rotating the polarization direction;
- detecting measuring light having interacted with the substrate at plural orientations of the polarization direction about the optical axis;
- interferometrically determining a surface map of the optical surface based on the detected measuring light;
- determining deviations of the optical surface of the substrate from a target shape thereof in dependence of the surface map; and
- machining the first surface of the optical substrate in dependence upon the determined deviations.

31. The method according to claim 30, wherein the cross section of the beam of measuring light is contained within a sector which has a circumferential extension about the optical axis of less than 30°, and wherein the sector is rotated about the optical axis together with the polarization direction.

32. The method according to claim 31, wherein the determining of the surface map of the optical surface comprises:
- interferometrically taking at least one measurement during a time period in which the sector is rotated by at least 170°.

33. The method according to claim 30, wherein the cross section of the beam of measuring light is a substantially circular cross section about the optical axis.

34. The method according to claim 33, wherein the determining of the surface map of the optical surface comprises:
- interferometrically taking at least one measurement by performing a plurality of partial measurements with the beam of measuring light polarized in different polarization directions; and
- averaging results of the plurality of partial measurements.

35. The method according to claim 30, wherein the determining of the surface map of the optical surface comprises:
- interferometrically taking a first measurement of first wavefronts generated by reflecting the beam of measuring light from the optical surface;
- rotating the substrate about an optical axis of the interferometer optics; and
- interferometrically taking a second measurement of second wavefronts generated by reflecting the beam of measuring light from the optical surface;
- wherein the surface map is determined in dependence of the first and second measurements.

36. The method according to claim 35, wherein the determining of the surface map of the optical surface further comprises:
- positioning a mirror in a focus of the beam of measuring light; and
- interferometrically taking a third measurement of third wavefronts generated by reflecting the beam of measuring light from the mirror;
- wherein the surface map is further determined in dependence of the third measurement.

37. The method according to claim 36, wherein the focus is provided by the interferometer optics.

38. The method according to claim 36, wherein the interferometer optics provides a first focus of the beam of measuring light and wherein an auxiliary optics is provided by imaging the first focus into a second focus, and wherein the mirror is positioned in the second focus.

39. The method according to claim 27, further comprising:
  machining the surface of the substrate in dependence of the determined deviations.

40. The method according to claim 39, wherein the machining is only performed if the deviations exceed a predetermined threshold.

41. The method according to claim 39, wherein the determining of deviations and the machining are repeatedly performed.

42. The method according to claim 39, further comprising a finishing of the surface of the substrate.

43. The method according to claim 42, wherein the finishing comprises applying a coating to the surface of the substrate.

44. The method according to claim 43, wherein the coating comprises at least one of a reflective coating, an anti-reflective coating and a protective coating.

45. The method according to claim 39, wherein a ratio of a diameter of the substrate over a radius of the surface of the optical substrate is higher than 0.4.

46. The method according to claim 39, wherein the ratio is higher than 0.55.

47. A method of manufacturing an optical system comprising a plurality of lenses, wherein at least one lens of the plurality of lenses is an optical substrate manufactured by the method comprising:
  providing an interferometer apparatus having an interferometer optics providing a beam of measuring light, wherein light in the beam of measuring light has at each location in a cross section of the beam a radial component polarized in a direction radially oriented with respect to an optical axis, and a tangential component polarized in a direction orthogonal to the radial component;
  polarizing the beam of measuring light such that the tangential component continuously increases relative to the radial component with increasing distance from the optical axis;
  arranging the substrate in the beam of measuring light;
  interferometrically determining a surface map of the optical surface;
  determining deviations of the optical surface of the substrate from a target shape thereof in dependence of the surface map; and
  machining the first surface of the optical substrate in dependence of the determined deviations.

48. A method of manufacturing an optical system comprising a plurality of lenses, wherein at least one lens of the plurality of lenses is an optical substrate manufactured by the method comprising:
  providing an interferometer apparatus having an interferometer optics providing a beam of measuring light;
  polarizing the beam of measuring light such that light of the beam is substantially linearly polarized in a polarization direction which is substantially constant across a cross section of the beam;
  rotating the polarization direction about an optical axis;
  arranging the substrate in a beam of measuring light while rotating the polarization direction;
  detecting measuring light having interacted with the substrate at plural orientations of the polarization direction about the optical axis;
  interferometrically determining a surface map of the optical surface based on the detected measuring light;
  determining deviations of the optical surface of the substrate from a target shape thereof in dependence of the surface map; and
  machining the first surface of the optical substrate in dependence upon the determined deviations.

* * * * *